United States Patent [19]
Herpich

[11] Patent Number: 5,913,538
[45] Date of Patent: Jun. 22, 1999

[54] FORCE LIMITER FOR A SAFETY BELT SYSTEM

[75] Inventor: Thomas Herpich, Uhingen-Sparwiesen, Germany

[73] Assignee: TRW Occupant Restraint Systems GmbH, Alfdorf, Germany

[21] Appl. No.: 08/917,430

[22] Filed: Aug. 19, 1997

[30] Foreign Application Priority Data

Aug. 22, 1996 [DE] Germany .......................... 296 14 587

[51] Int. Cl.$^6$ ................................................. B60R 22/28
[52] U.S. Cl. ........................ 280/805; 188/373; 242/379.1
[58] Field of Search ................................. 280/805, 806, 280/807; 188/373, 371; 242/379.1

[56] References Cited

U.S. PATENT DOCUMENTS

| | | | |
|---|---|---|---|
| 3,561,690 | 2/1971 | Muskat | 280/805 |
| 4,323,205 | 4/1982 | Tsuge et al. | 280/805 |
| 5,618,006 | 4/1997 | Sayles | 280/805 |
| 5,779,176 | 7/1998 | Hori et al. | 280/805 |

*Primary Examiner*—Paul N. Dickson
*Attorney, Agent, or Firm*—Tarolli, Sundheim, Covell, Tummino & Szabo

[57] ABSTRACT

A force limiter for a safety belt system is provided, which allows relative rotation-between a shaft and an anchoring part in a first direction when a predetermined torque acts between the shaft and the anchoring part. The force limiter comprises at least one deformable element which, in an initial condition thereof, extends from the anchoring part to the shaft and is at least in part trained about the shaft in a second direction opposite to the first direction.

2 Claims, 2 Drawing Sheets

FORCE LIMITER FOR A SAFETY BELT SYSTEM

BACKGROUND OF THE INVENTION

Typically, force limiters employed in safety belt systems are intended to limit the maximum force acting on the safety belt to a value which is uncritical for the vehicle occupant restrained by the safety belt. When this value is reached in the safety belt, a relative rotation or twist between shaft and the anchoring part the force limiter makes available an additional length of belt webbing, which may be used for additional deceleration displacement and prevents any further increase in the force acting in the safety belt.

Such a force limiter may be employed in various different positions in the safety belt system. In recent times belt retractors are being fitted with such a force limiter, which when the predetermined maximum force in the belt webbing is exceeded, permits twist of the belt drum in relation to the belt retractor in the belt webbing pay-off direction with the result that belt webbing is released. For this purpose it is more especially possible to utilize a torsion rod connected on the one hand with the belt drum and on the other hand with the belt retractor. When a certain torque as set by the dimension of the torsion rod is reached, the belt drum may be twisted in relation to the belt retractor with an elastic and/or plastic deformation of the torsion rod. A disadvantage of such a force limiter is however that the characteristic of such a force limiter, that is to say the function of torque versus angle of twist between the belt drum and the belt retractor or the function of belt webbing force versus paid off belt webbing, may only be modified to a small degree. Presently the only practice is to change the effective length of the torsion rod, for example by mechanically or electro-mechanically changing the effective length of the torsion rod during operation, in order to modify the characteristic of the force limiter, for instance for adaptation to the weight of a vehicle occupant. However this only allows a change to be made in the spring constant of the torsion rod; the characteristic as a whole can not be influenced.

BRIEF DESCRIPTION OF THE INVENTION

The present invention provides a force limiter whose characteristic may be set in any desired manner and thus adapted to the conditions of use. In accordance with the invention, a force limiter for a safety belt system is provided, which allows relative rotation between a shaft and an anchoring part in a first direction when a predetermined torque acts between the shaft and the anchoring part. The force limiter comprises at least one deformable element which, in an initial condition thereof, extends from the anchoring part to the shaft and is at least in part trained about the shaft in a second direction opposite to the first direction. Such a force limiter may be compared with a spring drive for a clock incorporating an extremely short spring. The twist occurring on force limitation between the shaft and the anchoring part then corresponds to a twist in a direction opposite to the direction in which the two ends of the spring are turned in relation to one another on tensioning the spring. Since the deformable element, acting as a "spring", is comparatively short, it will possess a large moment of resistance to such a twist in its initial state. Accordingly, below a torque set by the moment of resistance there will merely be a slight twist between the shaft and the anchoring part while there is a substantial increase in the acting torque. If the predetermined torque is exceeded, the coil of the "spring", constituted by the deformable element, is uncoiled. Since in this state the deformable element has a lower moment of resistance than in the initial state, the torque necessary for producing twist between the shaft and the anchoring part is reduced. It is now possible for a larger amount of twist to take place between the shaft and the anchoring part with a reduced torque, during which twisting action the deformable element is wound on the shaft in the direction opposite to the initial condition. In this condition the force limiter may be compared with a spring drive, in the case of which the spring is fully tensioned, that is to say tensioned until the turn of the spring abut each other. Accordingly further twist between the shaft and the anchoring part will only be possible on causing an extremely sharp increase in torque.

In the case of such a force limiter there is a function of belt webbing force versus paid off belt webbing, which has been found to be particularly suitable if in addition to the safety belt system a gas bag restraining system is employed. In a first phase of the restraining process the belt webbing force is to attain a predetermined, defined value. During this phase the vehicle occupant is practically exclusively restrained by the safety belt. This phase is followed by a phase in which the vehicle occupant is restrained by the combined action of the gas bag restraining system and the safety belt, the major part of the restraining effect being caused by the gas bag. Consequently an attempt should be made to cause the force acting in the belt webbing in this phase to drop to a value substantially below the predetermined value during the first phase so that owing to the paying off of an additional length of belt webbing, control of plunging of the vehicle occupant into the gas bag is possible. In a last phase of the restraining process on the other hand, a sharply increasing belt webbing force must again be provided for in order to prevent excessive forward displacement of the vehicle occupant in the case of a hard vehicle impact. It is specifically this characteristic which may be achieved with the force limiter of the invention. Owing to the moment of resistance of the deformable element, as set in the initial state of the force limiter, there is a controlled increase in the torque permitted by the force limiter and accordingly in the belt webbing force, before force limitation takes place. In the following phase of uncoiling of the winding of the deformable element there is a drop in the torque acting between the shaft and the anchoring part. As soon as the deformable element is coiled up in the opposite direction on the shaft, there will finally be a sharp increase in the torque.

By a selection of the length of the deformable element, of the number of coil turns of the deformable element on the shaft, of the number of deformable elements, of the material of the deformable element, its width and thickness and of various other parameters, it is possible to set the function of torque versus angle of twist between shaft and anchoring part in almost any desired way.

In accordance with a preferred embodiment of the invention the force limiter comprises two deformable sections. This leads to a particularly compact force limiter.

In accordance with a preferred embodiment of the invention, it is further provided a movable support element engaging the outer side of the deformable element. By means of this support element, the moment of resistance of the force limiter may be modified, more especially in the initial condition, so that the force limiter may be adapted to the weight of the vehicle occupant being restrained by the safety belt system.

In accordance with a further preferred embodiment, it is provided that the deformable element connects a belt drum of the belt retractor with the shaft thereof. In such a design the force limiter in accordance with the invention replaces a torsion rod as employed in conventional belt retractors for force limitation. The force limiter of the invention may in this case be arranged in the interior of the belt drum so that the overall design of such belt retractor does not have to be changed.

Further advantageous developments of the invention are defined in the dependent claims.

BRIEF DESCRIPTION OF THE DRAWINGS

The invention will now be described with reference to the accompanying drawings.

DETAILED DESCRIPTION OF THE INVENTION

Figure 1:
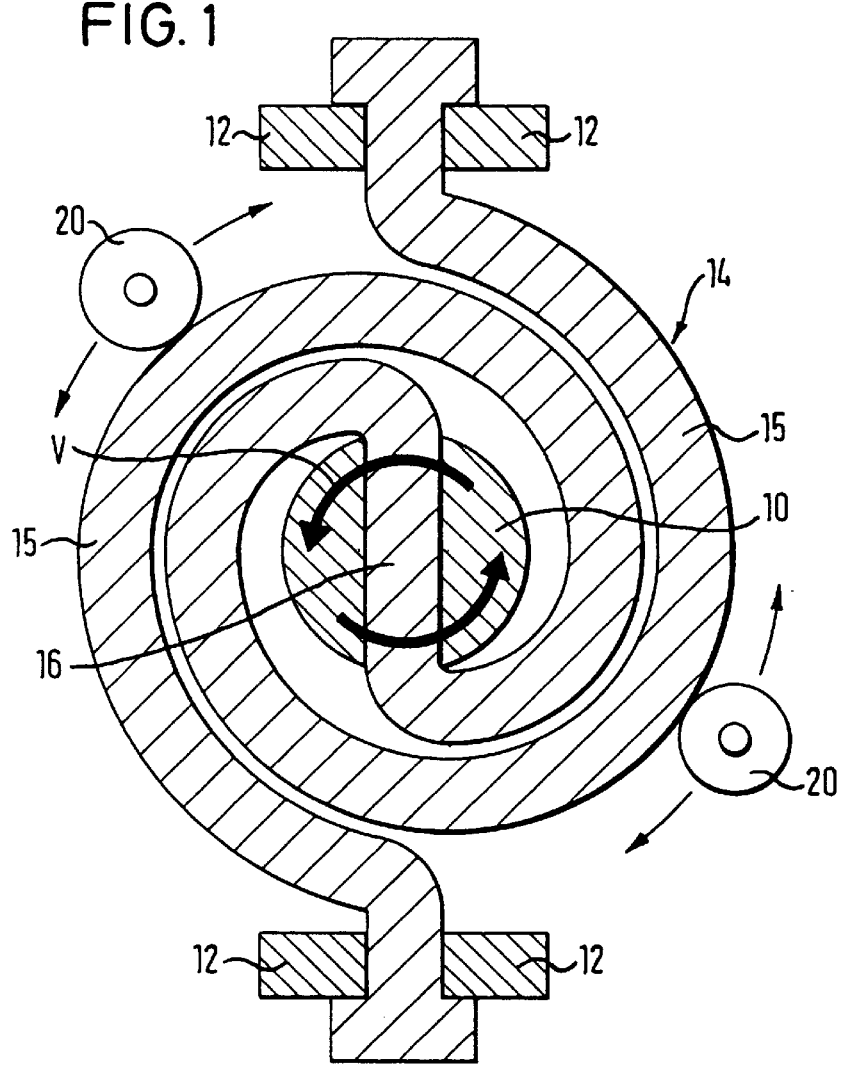
FIG. 1 diagrammatically shows a force limiter in accordance with the invention.

FIG. 1 diagrammatically shows a force limiter of the invention. The force limiter comprises a shaft 10, two anchoring parts 12 and a deformable element 14. The shaft 10 and the anchoring parts 12 may be twisted in relation to one another in the direction as indicated by the arrow V, the two anchoring parts 12 being stationary in relation to each other. The force limiting action is produced because above a certain, predetermined force acting as a torque between the anchoring parts 12 and the shaft 10, twist between the shaft 10 and the anchoring parts 12 is possible. This twist renders it possible to prevent a further increase in the force.

In the illustrated embodiment of the invention, the deformable element 14 comprises two deformable sections 15 which are connected to each other by a middle section 16, such section running right through a slot in the shaft 10. The deformable element 14 is held at both ends in the anchoring parts 12, such holding action being a double action so that only tension and transverse loads on the deformable element 14 may be taken up. In the initial state illustrated in FIG. 1, each deformable section 15 constitutes one turn which, starting at the anchoring parts 12, extends for 360° around the shaft 10 in a direction which is opposite to the direction V.

On the outer side of the coil formed by the deformable sections 15, a support element 20 is furthermore arranged able to be moved in the peripheral direction around the deformable sections 15. This support element may be moved mechanically or electromechanically for example.

In what follows a description of the function of the force limiter depicted in FIG. 1 will be given, reference being made to the function or curve represented in FIG. 2. In this figure, variations in tensile force F as a function of a displacement s are illustrated. This tensile force F, multiplied by its lever arm, takes the form of a torque effective between the shaft 10 and the anchoring parts 12, and the displacement s is the angle of twist between the shaft 10 and the anchoring parts 12, multiplied by the lever arm of the force F.

Figure 2:
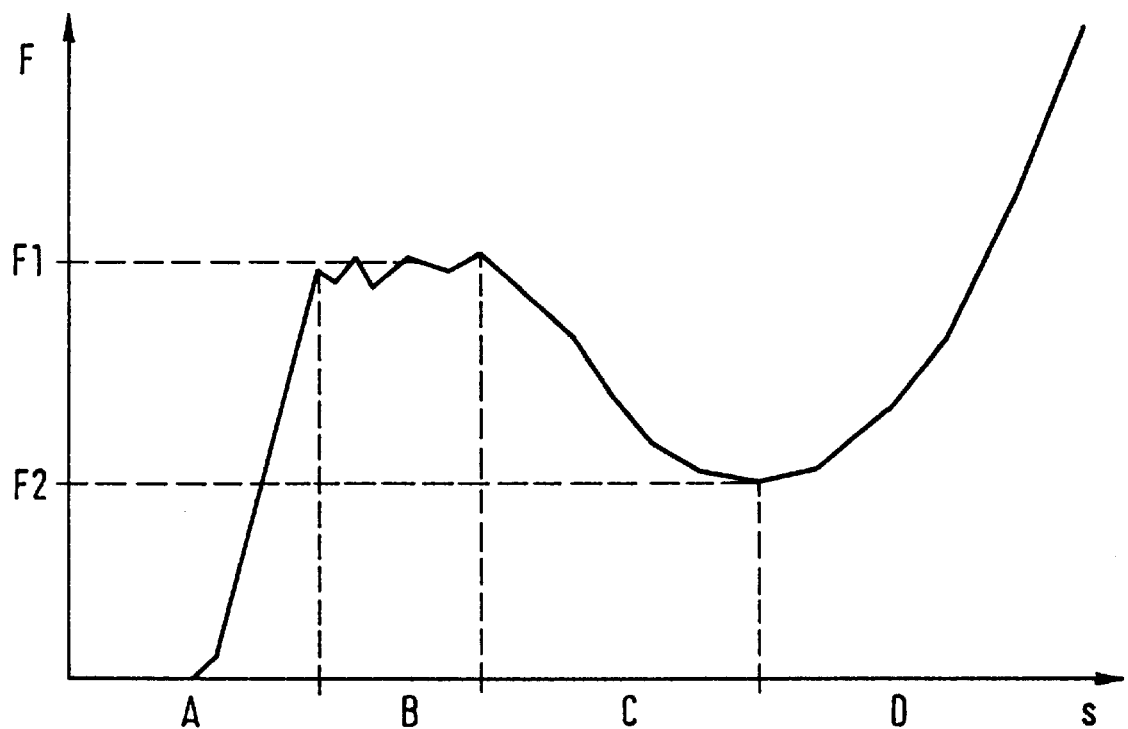
FIG. 2 shows an example for a function of belt webbing force versus paid off belt webbing length, which may be obtained with a force limiter in accordance with the invention.

If for example the shaft C is urged to move in the direction as indicated by the arrow V in relation to the anchoring parts 12, there will be a sharp increase in the effective force with a comparatively small amount of twist (portion A of FIG. 2). In this portion, twist between the shaft 10 and the anchoring parts 12 is counteracted by the moment of resistance of the deformable sections 15. This moment of resistance may be influenced by the support elements 20. If the support elements are located closer to the respective anchoring element for the deformable section 15 associated to them, that is to say turned counter-clockwise out of the position illustrated in FIG. 1, there will be a comparatively small moment of resistance. If on the other hand the support elements 20 are further spaced from the corresponding anchoring parts 12, i.e. twisted clockwise as related to the position depicted in FIG. 1, there will be a high moment of resistance. Furthermore, the moment of resistance will be affected by the respectively selected shape of the deformable element 14, by the material selected and the like.

In a manner dependent on the respectively selected moment of resistance, a predetermined force F1 will be reached at the end of portion A. After this there will be an uncoiling of the turns formed by the deformable sections 15. In a first portion, corresponding to portion B of FIG. 2, the force required for uncoiling the turns will be approximately constant. Following this there will be a pronounced drop in the force as far as a second value F2. This portion, wherein the deformable sections 15 are wound or coiled back onto the shaft 10 in a direction opposite to that as indicated in FIG. 1, corresponds to portion C of FIG. 2. Finally, as twisting is continued, there will be a renewed sharp increase in the force, since the deformable sections 15 closely encircle the shaft 10 like a spiral spring wound up tight until the turns abut each other. This portion with an increasing force is represented as portion D in FIG. 2. In this state, owing to the double anchoring support sections, only tensile forces act so that a high load carrying capacity is produced. Furthermore, between the shaft and the deformable sections friction occurs, which reduces the load on the deformable sections, more especially adjacent to shaft 10, in which the deformable element is bent round through 180°. Accordingly the deformable element may be subjected to an extremely high load.

Figure 3:
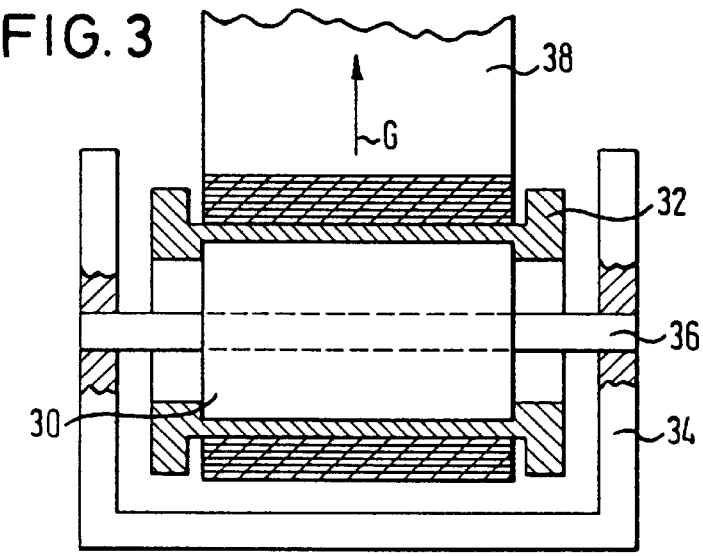
FIG. 3 diagrammatically shows a force limiter in accordance with the invention arranged in the interior of belt drum.

FIG. 3 diagrammatically shows a force limiter of the invention, which is incorporated in a belt retractor. The force limiter is generally referenced 30. The anchoring parts of the force limiter are formed in the interior of a belt drum 32 of a belt retractor, which is mounted for rotation in a housing 34. The shaft of the force limiter corresponds to a shaft 36 of the belt retractor, which may be locked in a manner responsive to the belt webbing or to the vehicle by means of a locking device (not illustrated). When the shaft 36 is locked and tensile force starts acting in the direction G in the diagrammatically illustrated belt webbing 38, a torque will act between the belt drum 32 and the shaft 36, which is equal to the belt webbing force multiplied by the radius of engagement of the belt webbing on the belt drum. When a predetermined belt webbing force is exceeded, there will be relative twist between the belt drum 32 and the shaft 36 in the manner indicated with the result that additional belt webbing is released. The length s of the paid off belt webbing will in this case correspond to the angle of the twist between the belt drum and the shaft multiplied by the radius of engagement of the belt webbing.

Figure 4:
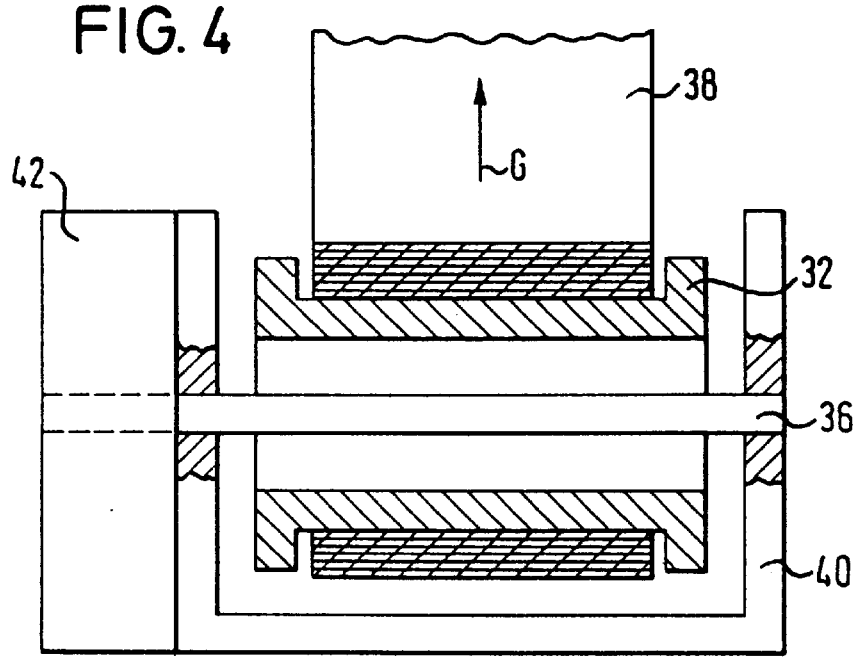
FIG. 4 diagrammatically shows a force limiter mounted between the belt retractor and the vehicle.

FIG. 4 diagrammatically depicts a belt retractor in which by means of a force limiter 42 in accordance with the invention, the belt drum 32 of the belt retractor is connected with the shaft 36 rotatably mounted in the frame 40 of the belt retractor in a manner similar the case of the belt retractor of FIG. 3. The sole departure from the belt retractor of FIG. 3 is that the force limiter is not arranged in the interior of belt drum but outside the frame 20.

It is of course possible to provide more than one deformable element in a force limiter of the invention. Similarly it is possible for the thickness and/or the width of the deformable element to vary along its length. For the deformable element a ductile material is employed, as for example steel. This renders it possible to rely on bend and roll deformation and following tensile loading to obtain the desired torque/twist angle function.

I claim:

1. A force limiter for a safety belt system, which allows relative rotation between a shaft and an anchoring part in a first direction when a predetermined torque acts between said shaft and said anchoring part, and which comprises at least one deformable element which, in an initial condition thereon, extends from said anchoring part to said shaft and is at least in part trained about said shaft in a second direction opposite to said first direction, said deformable element comprising two deformable sections, said shaft being provided with a slot and said deformable element being provided with a middle section extending through said slot.

2. The force limiter of claim 1, wherein each of said deformable sections of said deformable element is trained round said shaft through 360°.

* * * * *